United States Patent [19]

Iino

[11] Patent Number: 4,804,836
[45] Date of Patent: Feb. 14, 1989

[54] OPTICAL APPARATUS HAVING MOVING MEANS FOR PROTECTING AN OPTICAL ELEMENT FOR USE IN AUTOMOTIVE VEHICLE

[75] Inventor: Tadashi Iino, Susono, Japan
[73] Assignee: Yazaki Corporation, Japan
[21] Appl. No.: 147,857
[22] Filed: Jan. 25, 1988
[51] Int. Cl.$^4$ .............................................. G09C 3/02
[52] U.S. Cl. ....................................... 250/201; 340/705
[58] Field of Search ................... 250/201 R; 340/705, 340/795, 815.32

[56] References Cited

U.S. PATENT DOCUMENTS 4,616,226 10/1986 Morley ................................ 340/795
4,719,342 1/1988 Cohn et al. .................... 250/201 R Primary Examiner—David C. Nelms
Assistant Examiner—Stephone B. Allen
Attorney, Agent, or Firm—Wigman & Cohen

[57] ABSTRACT

The optical apparatus for an automotive vehicle comprises a pivotal casing for accommodating optical elements; a half mirror for partially reflecting light introduced into the apparatus from the outside; a photosensor for detecting light reflected from the half mirror; a controller for generating an actuator signal when the photosensor detects intense light; and a motor or solenoid for moving the pivotal casing in response to the actuator signal to dislocate the optical path of the optical apparatus from the normal optical position to a protective position from intense sunlight. Further, when an ignition switch is connected in series to the controller, it is possible to protect the optical device from external light even when the vehicle is kept parked.

11 Claims, 7 Drawing Sheets

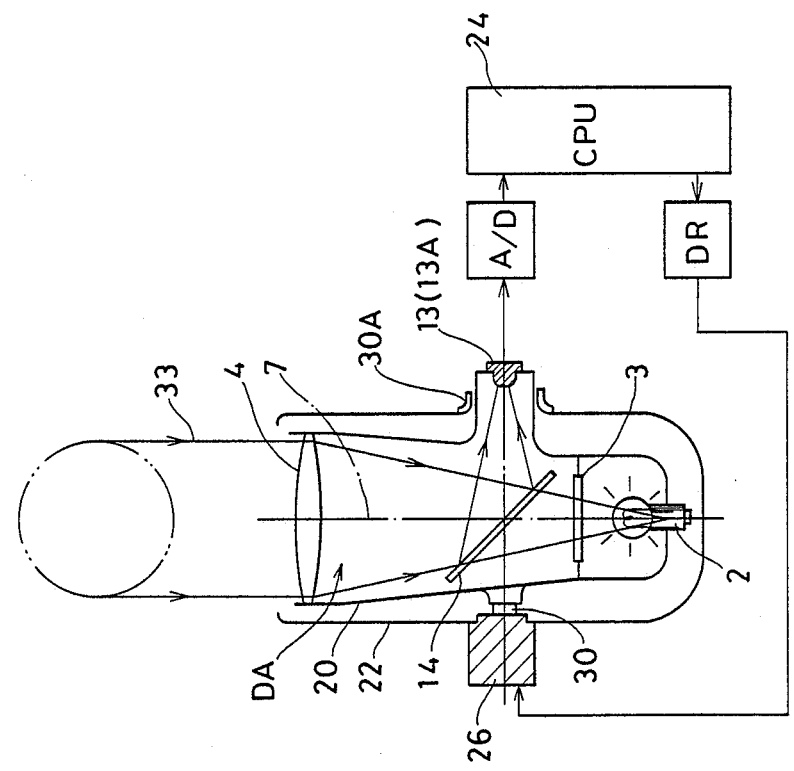
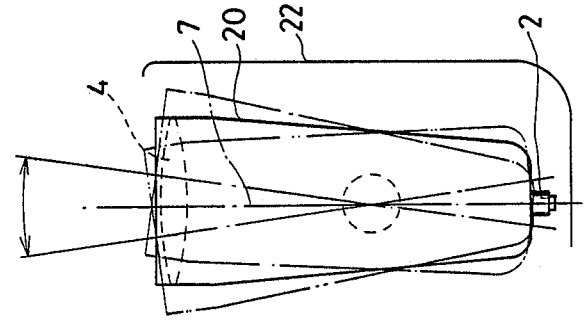
FIG.6(A)
FIG.6(B)

OPTICAL APPARATUS HAVING MOVING MEANS FOR PROTECTING AN OPTICAL ELEMENT FOR USE IN AUTOMOTIVE VEHICLE

BACKGROUND OF THE INVENTION

1. Field of the Invention

The present invention relates generally to an optical apparatus for an automotive vehicle, and more specifically to an optical apparatus which can protect various optical elements housed in the optical apparatus for an automotive vehicle from intense sunlight.

2. Description of the Prior Art

Recently, various optical apparatus which transmit light toward the outside or receive light from the outside through a lens or lenses are mounted on an automotive vehicle for various purposes. In these optical apparatus, when intense sunlight is directly or even indirectly applied to the optical elements arranged in the optical apparatus in summer, in particular, there exists a probelm in that the inner optical elements are heated to high temperature and therefore damaged. To overcome this problem, there has been proposed an optical apparatus provided with a shutter for covering the optical path when the intensity of light introduced into the optical apparatus from the outside exceeds a predetermined value. In these prior-art optical apparatus when an ignition key is once turned off or when the vehicle is left parked or in trouble, there still exists a problem in that the protective shutter will not be actuated and therefore the optical elements are damaged by heat.

The arrangements of the prior-art optical apparatus will be described in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide an optical apparatus for an automotive vehicle provided with a safety device which can protect the optical apparatus from external intense sunlight.

To achieve the above-mentioned object, an optical apparatus for an automotive vehicle according to the present invention comprises: (a) optical means for transmitting/receiving light outside/inside the vehicle to generate optical images/signals related to the vehicle; (b) moving means, associated with said optical means, for moving at least an optical path of said optical means from a normal optical position to a protective optical position at which external light is not directly introduced into said optical means; (c) light detecting means, disposed along an optical path of said optical means, for detecting light introduced into said optical means; (d) control means, connected to said light detecting means, for generating an actuator signal when said light detecting means detects intense light exceeding a predetermined value; and (e) actuator means, responsive to the actuator signal, for actuating said moving means to move the optical path of said optical means from the normal optical position to the protective optical position.

The moving means is a pivotal casing for accommodating optical elements, or a pivotal mirror for changing the direction of the optical path thereof. The light detecting means is a half mirror and a photosensor or a temperature sensor. The actuator means is a motor or a solenoid.

Further, where an ignition switch is connected in series with the control means, the actuator means is deactivated to move the optical means to a protective position, whenever the ignition switch is kept turned off (when the vehicle is kept parked).

In the optical apparatus of the present invention, when intense sunlight is introduced into the optical path of the apparatus and therefore the intensity of light or the temperature within the apparatus exceeds a predetermined value, since the abnormal condition can be detected by the detecting means and the optical apparatus is pivoted to a protective position where sunlight is not introduced thereinto, it is possible to effectively protect the apparatus from heat due to intense sunlight.

BRIEF DESCRIPTION OF THE DRAWINGS

The features and advantages of the optical apparatus for an automotive vehicle according to the present invention will be more clearly appreciated from the following description of the preferred embodiment of the invention taken in conjunction with the accompanying drawings in which like reference numerals designate the same or similar elements or sections throughout the figures thereof and in which:

FIG. 6(A) is a diagrammatical side view, including a block diagram, showing a first embodiment of the optical apparatus for an automotive vehicle according to the present invention;

FIG. 6(B) is a diagrammatical front view for assistance in explaining the movement of an optical apparatus shown in FIG. 6(A);

DETAILED DESCRIPTION OF THE PREFERRED EMBODIMENTS

To facilitate understanding of the present invention, a reference will be made to prior-art optical apparatus for an automotive vehicle, with reference to the attached drawings.

Figure 1A:
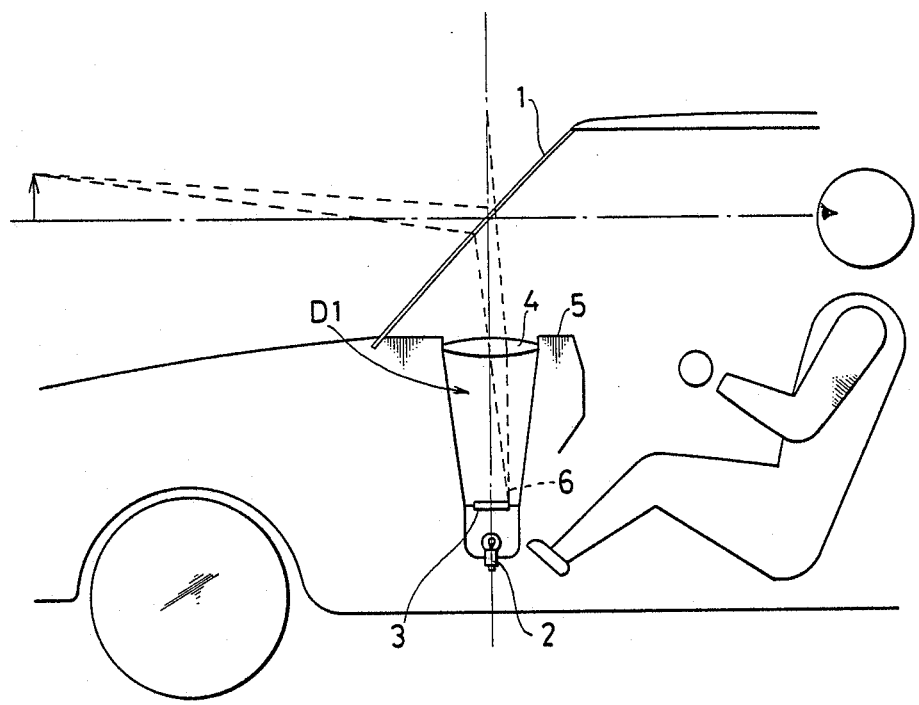
FIG. 1(A) is a diagrammatical side view showing a first example of prior-art optical apparatus for an automotive vehicle.

FIG. 1(A) shows a first example of prior-art optical apparatus for an automotive vehicle, called head up display, which is arranged in a passenger compartment of a vehicle body. In the drawings, a head up display device D1 disposed near a windshield 1 of an automotive vehicle includes a light source 2, a display unit 3 such as liquid crystal device, a lens 4 disposed near a dashboard 5. In this display device D1, a display image 6 obtained through the display unit 3 is passed through the lens 4 and reflected from the inner surface of the windshield 1 to the driver. Therefore, the driver can see the display image ahead of the windshield 1 as a virtual image in superimposition upon the outside view.

Figure 1B:
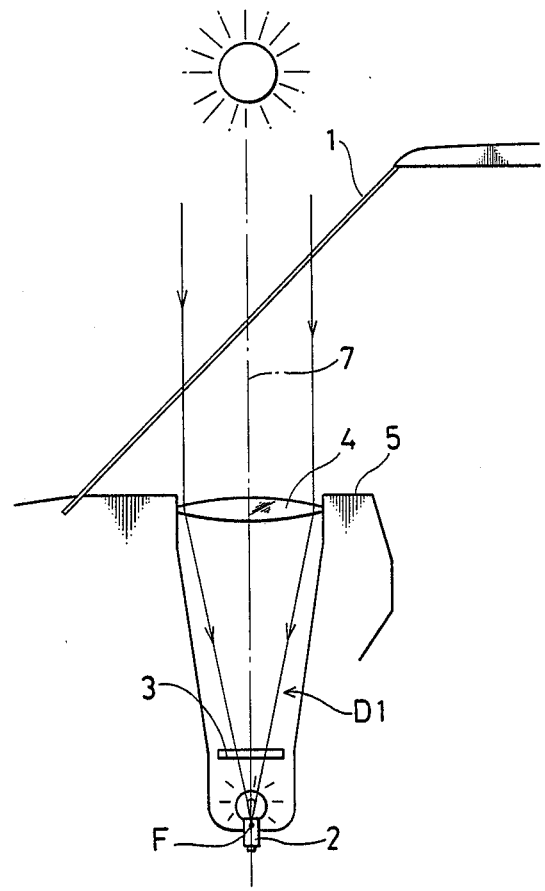
FIG. 1(B) is a diagrammatical side view for assistance in explaining the problem involved in the optical apparatus shown in FIG. 1(A)

In the above optical apparatus as shown in FIG. 1(A), when intense sunlight is allowed to be incident upon the optical axis 7 of the head up display device D1 as shown in FIG. 1(B), since the sunlight passed through the lens 4 is directly focused at a point F near the light source 2, the light source 2 is heated to a high temperature (e.g. 100° C.) in a short time (e.g. 5 sec), and further may be damaged in midsummer, for instance.

Figure 2A:
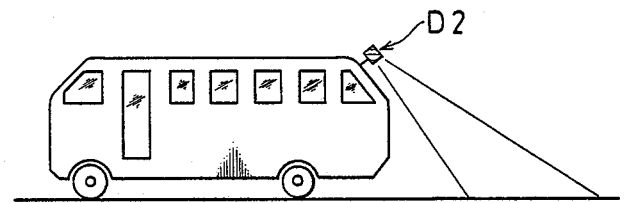
FIG. 2(A) is an illustration showing a second example of prior-art optical apparatus for an automotive vehicle.
Figure 2B:
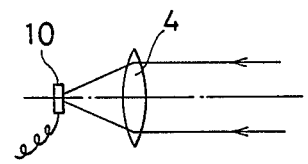
FIG. 2(B) is a view showing optical elements of the apparatus shown in FIG. 2(A)
Figure 3A:
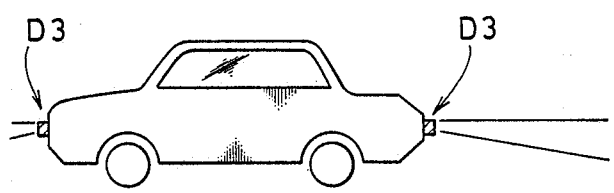
FIG. 3(A) is an illustration showing a third example of prior-art optical apparatus for an automotive vehicle.
Figure 3B:
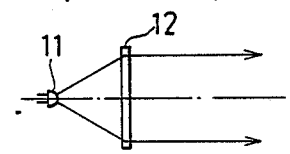
FIG. 3(B) is a view showing optical elements of the apparatus shown in FIG. 3(A)
Figure 4A:
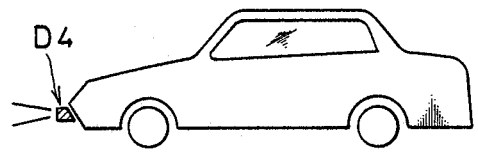
FIG. 4(A) is an illustration showing a fourth example of prior-art optical apparatus for an automotive vehicle.
Figure 4B:
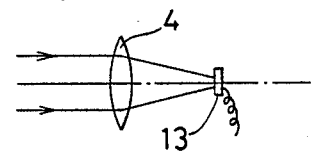
FIG. 4(B) is a view showing optical elements of the apparatus shown in FIG. 4(A)

FIGS. 2 to 4 show other examples of optical apparatus for an automotive vehicle, which are arranged outside the vehicle body.

In more detail, FIG. 2(A) shows a monitor TV camera D2 disposed at the rear portion of a long vehicle body of trucks or buses in order to monitor the rearward view. This optical device D2 includes image-sensitive elements 10 and a lens 4, as shown in FIG. 2(B).

FIG. 3(A) shows a distance sensor D3 disposed at the front and rear ends of a vehicle in order to detect front and rear distances to the nearest other vehicles or objects. This optical device D3 includes a laser diode 11 and a Fresnel lens 12, for instance, respectively.

FIG. 4(A) shows a beam selecting device D4 disposed at the front end of a vehicle in order to detect the intensity of light emitted from another vehicle coming up to the vehicle at night and automatically switch the head light from high beam to low beam or vice versa. This optical device D4 includes a lens 4 and a photosensor element 13, for instance.

In these optical apparatus D2 to D4, although sunlight may not be allowed to be directly incident upon the optical devices, when the vehicle is running or kept parked on a slope or when a reflector having a high reflectivity is located near the vehicle, there still exists a danger in that strong sunlight may damage the optical apparatus or the optical elements.

Figure 5:
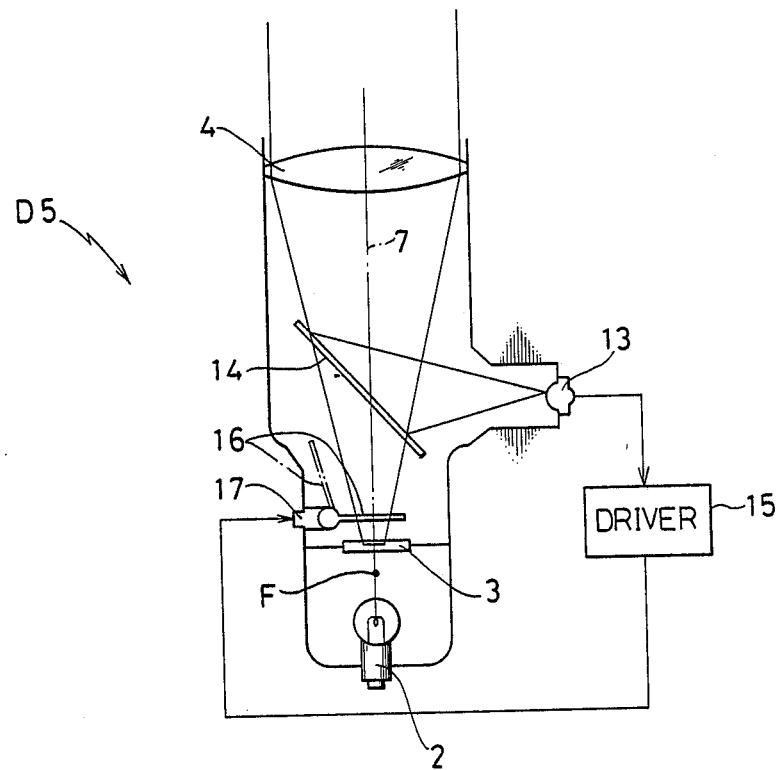
FIG. 5 is a diagrammatical view showing a fifth example of prior-art optical apparatus provided with a protective shutter.

FIG. 5 shows another prior-art optical apparatus for an automotive vehicle, which is provided with a protective shutter. That is, the optical device D5 further comprises a half mirror 14 disposed between the display unit 3 and the lens 4 to partially reflect an external beam coming along the optical axis 7 of the lens 4, a photosensor element 13 for detecting the beam reflected by the half mirror 14, a driver circuit 15 for generating an actuator signal when the intensity of light reflected from the half mirror 14 exceeds a predetermined value, a shutter member 16 for protecting the display unit 3 from sunlight, and a shutter actuator 17 for actuating the shutter member 16 in response to the actuator signal.

In the above-mentioned prior-art optical apparatus provided with the protective shutter, when the ignition key is turned off, since the photosensor element 13, the driver circuit 15 are both not operative, the protective shutter element 16 will not be actuated operated effectively. In other words, in the prior-art optical apparatus as shown in FIG. 5, there still exists a problem in that the display unit 3 and the light source 2 may be damaged in summer when the vehicle is kept parked or when the electric circuit system of the vehicle is in trouble.

In view of the above description, reference is now made to a first embodiment of the optical apparatus according to the present invention.

FIGS. 6(A) and 6(B) show the first embodiment, which is applied to a head up display, for instance. In the drawings, the optical apparatus DA comprises roughly a first pivotal casing 20, a second fixed casing 22, a CPU 24 and an actuator 26. In more detail, a light source 2, a display unit 3, a lens 4, a half mirror 14, and a photosensor element (e.g. photodiode) 13 are housed within the first pivotal casing 20. This first pivotal casing 20 is pivotably supported by a shaft 30 fixed to the first pivotal casing 20 and a bearing portion 30A formed in the second fixed casing 22 within the second fixed casing 22 fixed to the dashboard. The CPU (microcomputer) 24 receives sensor signals outputted from the photosensor element 13 via an analog/digital converter A/D and outputs an actuator signal to the actuator 26 via a driver circuit DR to pivot the first pivotal casing 20. The actuator 26 is a driving device (e.g. motor) including a transmission mechanism (e.g. gears).

The operation of the optical apparatus shown in FIGS. 6(A) and 6(B) will be described hereinbelow.

Under the normal conditions, display images formed by the display unit 3 is projected in the upward direction by the aid of the light source 2 through the lens 4 and reflected from a windshield, for instance, to the driver. Further, although the external light passed through the lens 4 is introduced into the first pivotal casing 20, since the intensity of the light is not high, the level of the photosensor element 13 is low, so that the CPU 24 will not generate an actuator signal to the driver circuit DR. Under these conditions, the actuator 26 is not actuated and therefore the first pivotal casing 20 is supported at the normal position within the second fixed casing 22, as shown solid lines in FIG. 6(B).

When intense sunlight 33 is allowed to be directly incident upon the lens 4 along the optical axis 7 of the optical apparatus DA, part of sunlight 33 is reflected from the half mirror 14 to the photosensor 13. When an analog voltage level of this photosensor element 13 exceeds a predetermined value, or a predetermined time has elapsed after the analog voltage level exceeded a predetermined value, the analog photosensor signal is converted from an analog signal to a digital signal and applied to the CPU 24. In response to this digital photosensor signal, the CPU 24 generates an actuator signal to the actuator 26 via the actuator driver DR. Therefore, the actuator 26 pivots the first pivotal casing 20 right or left to a protective position within the second fixed casing 22, as shown by dot-dashed lines or dot-dot-dashed lines in FIG. 6(B). As a result, intense sunlight is not directly introduced into the display device DA and therefore the intensity of the light decreases or the temperature of the display apparatus DA decreases. When a decrease in the output level of the photosensor element 13 is detected by the CPU 24, the CPU 24 keeps outputting an actuator signal to the actuator 26 for a predetermined period of time in order to protect the optical apparatus DA from intense sunlight. However, after a predetermined time has elapsed, the CPU 24 stops outputting the actuator signal to the actuator 26, so that the first pivotal casing 20 is returned to the original normal position, as shown by solid lines in FIG. 6(B).

In the above description, the intensity of the external light is detected by the photosensor 13. Without being limited thereto, however, it is also possible to detect the temperature within the optical apparatus by a temperature sensor 13A. In this case, when the temperature of the optical apparatus DA exceeds a predetermined temperature, the actuator signal is generated from the CPU 24; and when a drop in temperature is detected or when the temperature of the optical apparatus DA drops below a predetermined value, the CPU 24 stops generating an actuator signal. Further, where the temperature is detected to protect the apparatus, the half mirror 14 is unnecessary and the temperature sensor 13A is effectively attached near the light source 2, for instance.

Figure 7:
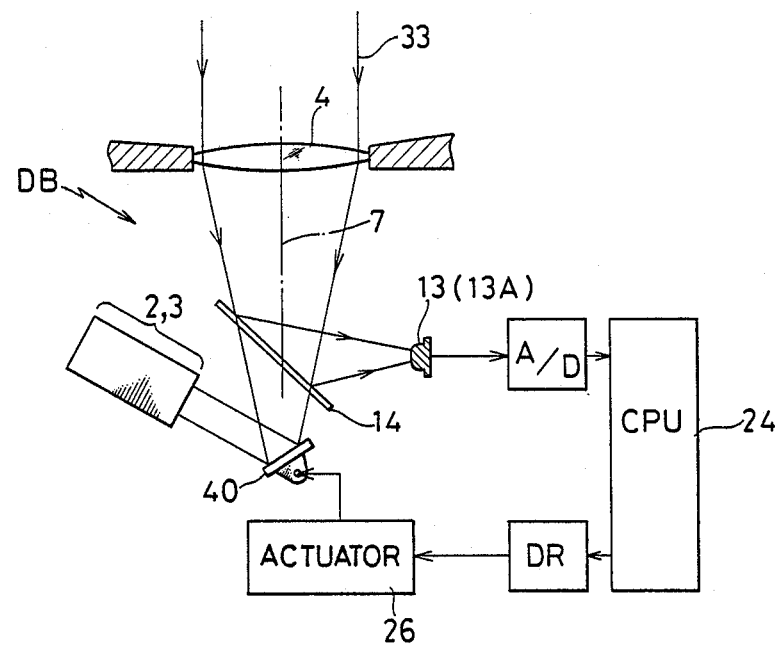
FIG. 7 is a diagrammatical view, including a block diagram, showing a second embodiment of the optical apparatus for an automotive vehicle according to the present invention.

FIG. 7 shows a second embodiment of the optical apparatus DB of the present invention. In this embodiment, the light emitted from the light source 2 via the display unit 3 is first guided in the downward direction and then reflected in the upward direction along the optical axis 7 by a mirror member 40 pivotable by an actuator 26. When intense sunlight 33 is introduced into the optical apparatus DB, the actuator 26 is actuated to pivot the mirror member 40, so that the intense sunlight 33 is not applied to the display unit 3. In this embodiment, since only the light source 2 and the display unit 3 are pivoted for protection against sunlight, it is possible to reduce the pivoting power of the actuator 26, as compared with the optical apparatus DA shown in FIG. 6, in which the almost all optical elements are pivoted.

In the above embodiments, it is not necessary to perfectly pivot the optical apparatus from the normal position to the protective position. This is because it is possible to protect the apparatus from the direct sunlight by slightly pivot the optical axis. Further, when the apparatus is slightly pivoted from the normal position, it is possible to still use the optical apparatus (in the case of the display apparatus, display image is a little dislocated), while protecting the apparatus from sunlight.

Figure 8:
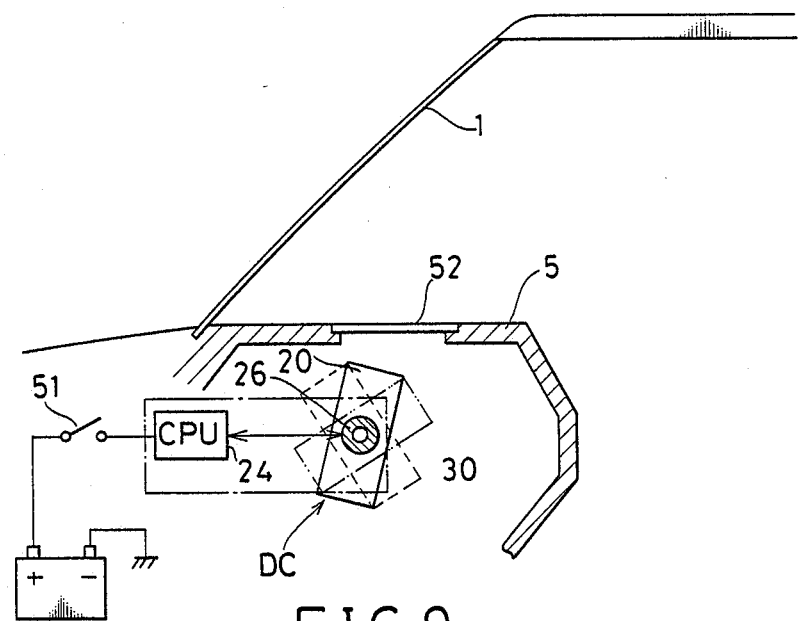
FIG. 8 is a diagrammatical view, including a block diagram, showing a third embodiment of the optical apparatus for an automotive vehicle according to the present invention.

FIG. 8 shows a third embodiment of the present invention, in which a display apparatus DC is further provided with a countermeasure against when the ignition switch is turned off. In the same way as the optical apparatus DA shown in FIG. 6(A), the light source 2, the display unit 3, the lens 4, and the half mirror 14 are all housed within a pivotal casing 20 having a shaft 30. Further, although not sown, a photosensor element 13 (e.g. photodiode) is housed in the casing 20. The CPU (microcomputer) 24 receives sensor signals outputted from the photosensor element 13 via an analog-digital converter (not shown) and outputs an actuator signal to an actuator 26 via a driver circuit (not shown) to pivot the pivotal casing 20. The actuator 26 is a driving device (e.g. motor) including a transmission mechanism (e.g. gears). The CPU 24 is connected to a battery via an ignition switch 51.

The feature of this embodiment DC is to locate the pivotal casing 20 at the normal position where the optical apparatus is usable through a transparent plate (glass) 52 attached to the dashboard 5, only when the ignition switch 51 is kept turned on and further no sunlight is directly introduced into the optical apparatus DC.

In more detail, when the ignition switch 51 is turned off, the pivotal casing 20 is pivoted counterclockwise to the initial position as shown by dashed lines in FIG. 8, so that the optical apparatus DC is protected from intense external sunlight. When the ignition switch 51 is turned on and no sunlight is directly introduced into the pivotal casing 20, the pivotal casing 20 is normally pivoted clockwise to the normal position as shown by solid lines in FIG. 8, so that the optical apparatus is directed outward through the transparent plate 52 for the normal use. When intense sunlight is introduced into the pivotal casing 20 with the ignition switch 51 kept turned on, the pivotal casing 20 is further pivoted clockwise beyond the normal position to the protective position as shown by dot-dot-dashed lines in FIG. 8, so that the optical apparatus is protected from direct sunlight.

The above-mentioned feature can be applied to the optical apparatus DB as shown in FIG. 7. In this case, the mirror 26 is moved or pivoted in place of the pivotal casing 20.

Figure 9:
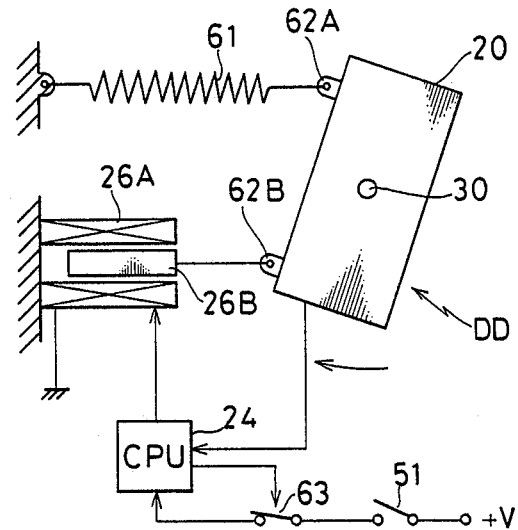
FIG. 9 is a partial illustration showing a fourth embodiment of the optical apparatus for an automotive vehicle according to the present invention.

FIG. 9 shows a fourth embodiment of the present invention, in which a solenoid 26A and a plunger 26B are used as the actuator. When the ignition switch 51 is turned off, since the solenoid 26A is deenergized, the pivotal casing 20 is pivoted counterclockwise by an elastic force of a spring 61 to the protective position. However, when the ignition switch 51 is turned on, the CPU 24 energizes the solenoid 26A to attract the plunger 26B as shown in FIG. 9, so that the pivotal casing 20 is pivoted clockwise to the normal position where the apparatus DD is directed toward the outside through the transparent plate for normal use. In case intense sunlight is directly introduced into the apparatus DD, the CPU 24 turns off a protective switch 63, so that the solenoid 26A is deenergized to pivot the casing 20 counterclockwise to the protective position for protection of the apparatus DD from the external sunlight, even if the ignition switch 51 is kept turned on.

As described above, in the optical apparatus according to the present invention, when the apparatus is directly irradiated with intense sunlight, since the apparatus is dislocated from the normal position for protection from the intense sunlight, it is possible to effectively prevent the apparatus from being heated excessively and therefore damaged. Further, since the optical apparatus is dislocated from the normal position when the ignition key is turned off, it is possible to protect the optical apparatus from sunlight even when the vehicle is kept parked.

What is claimed is:

1. An optical apparatus for an automotive vehicle, comprising:
    (a) optical means for transmitting/receiving light outside/inside the vehicle to generate optical images/signals related to the vehicle;
    (b) moving means, associated with said optical means, for moving at least an optical path of said optical means from a normal optical position to a protective optical position at which external light is not directly introduced into said optical means;
    (c) light detecting means, disposed along an optical path of said optical means, for detecting light introduced into said optical means;
    (d) control means, connected to said light detecting means, for generating an actuator signal when said light detecting means detects intense light exceeding a predetermined value; and (e) actuator means, responsive to the actuator signal, for actuating said moving means to move the optical path of said optical means from the normal optical position to the protective optical position.

2. The optical apparatus as set forth in claim 1, wherein said moving means is a pivotal casing for accommodating optical elements of said optical means.

3. The optical apparatus as set forth in claim 1, wherein said moving means is a pivotal mirror for changing a direction of the optical path of said optical means.

4. The optical apparatus as set forth in claim 1, wherein said light detecting means comprises:
   (a) a half mirror, disposed midway of the optical path, for partially reflecting light introduced into the optical apparatus from the outside; and
   (b) a photosensor for detecting light partially reflected from said half mirror.

5. The optical apparatus as set forth in claim 1, wherein said light detecting means is a temperature sensor, disposed within said optical means, for detecting a rise in temperature of said optical means due to intense light.

6. The optical apparatus as set forth in claim 1, wherein said control means keeps generating the actuator signal for a predetermined time period after said light detecting means had detected intense light.

7. The optical apparatus as set forth in claim 1, wherein said control means keeps generating the actuator signal until said light detecting means detects no intense light.

8. The optical apparatus as set forth in claim 1, wherein said actuator means is a motor for pivoting said optical means.

9. The optical apparatus as set forth in claim 1, wherein said actuator means is a solenoid for pivoting said optical means which is elastically biased.

10. The optical apparatus as set forth in claim 1, which further comprises a vehicle ignition switch, connected in series with said control means, for deactivating said actuator means to move said optical means to a protective position when the ignition switch is turned off.

11. The optical apparatus as set forth in claim 10, which further comprises a protective switch, connected in series with the ignition switch, said protective switch being turned off in response to the actuator signal from said control means to move said optical means to the protective position, even when the ignition switch is kept turned on.

* * * * *